United States Patent [19]

Sturm et al.

[11] 4,000,372
[45] Dec. 28, 1976

[54] TELEPHONE CALL AMOUNT RECORDER

[75] Inventors: Zeynab E. Sturm, Brooklyn; George Spector, New York, both of N.Y.

[73] Assignee: Grandma Sturm's Enterprises, Inc., Brooklyn, N.Y.

[22] Filed: Nov. 11, 1974

[21] Appl. No.: 522,444

[52] U.S. Cl. ............................................. 179/7 R
[51] Int. Cl.² .......................................... H04M 15/00
[58] Field of Search ............... 179/7.1 R, 7 R, 90 D

[56] References Cited
UNITED STATES PATENTS

| | | | |
|---|---|---|---|
| 2,064,274 | 12/1936 | Shann | 179/7 R |
| 2,229,308 | 1/1941 | Recker | 179/7.1 R |
| 2,588,935 | 3/1952 | Oran | 179/7.1 R |
| 2,629,781 | 2/1953 | Feinstein | 179/7.1 R |
| 3,832,497 | 8/1974 | Vogt | 179/90 D |

Primary Examiner—Kathleen H. Claffy
Assistant Examiner—Gerald L. Brigance
Attorney, Agent, or Firm—Pamela D. Kasa

[57] ABSTRACT

An accessory attachable on a telephone receiver which keeps a record of the number of telephone calls that are made from the receiver; the accessory including a lever activated when the telephone dial is turned so to make additions on a counter mechanism either for local calls or long distance calls, and the accessory also including mechanism that prevents recording any telephone calls that are either a wrong number, an unanswered call or a call to a telephone operator requesting information, so that only calls are recorded which will appear on a person's bill at the end of the month.

5 Claims, 9 Drawing Figures

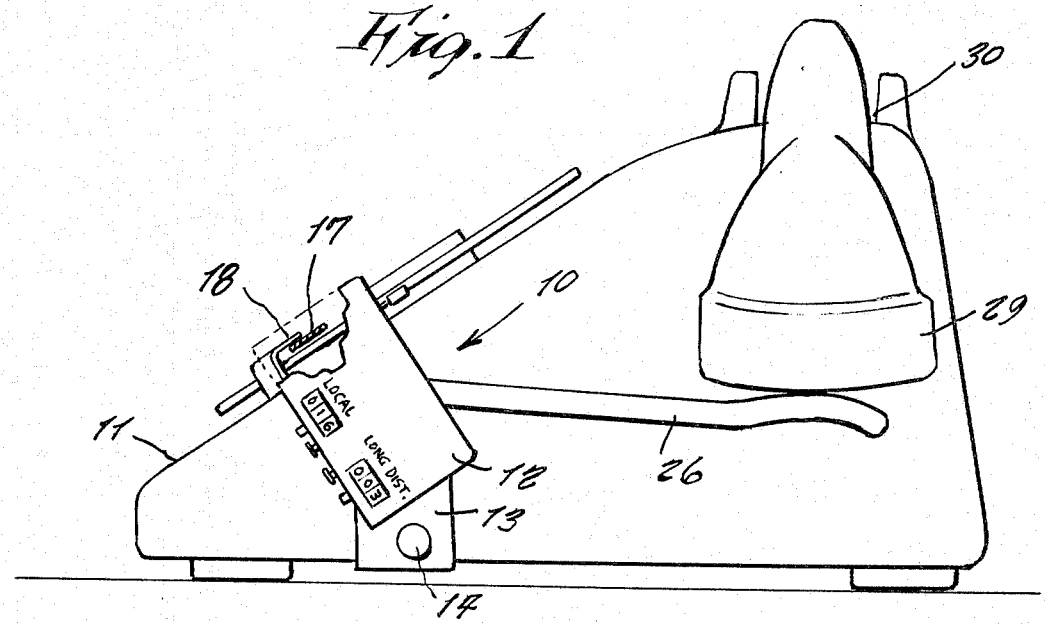
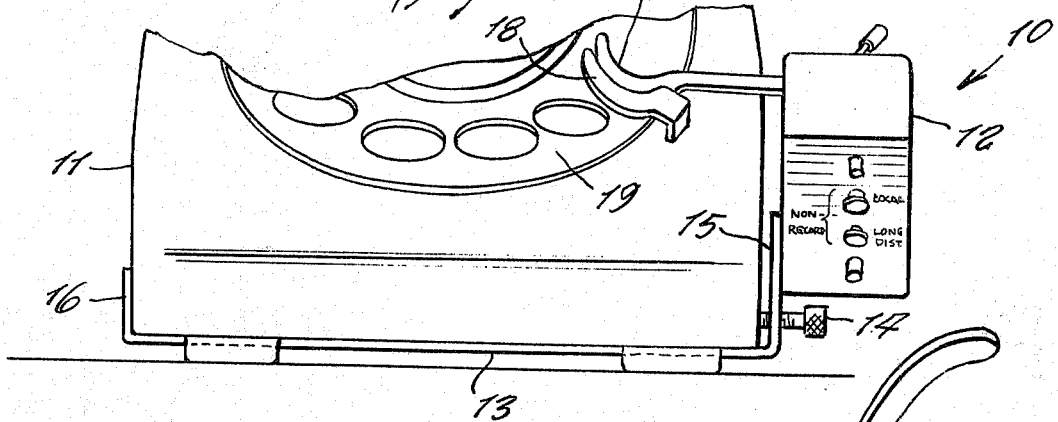
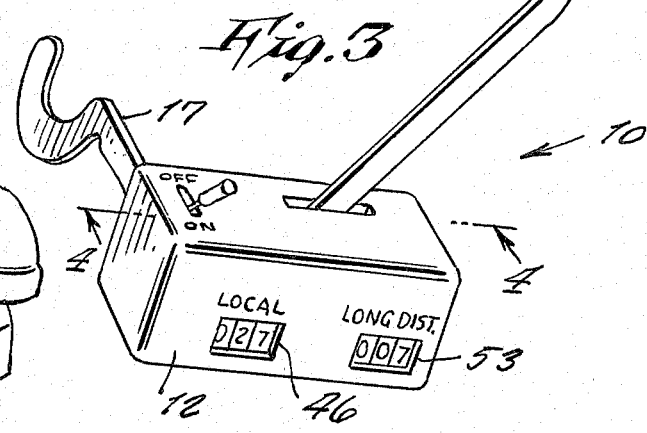
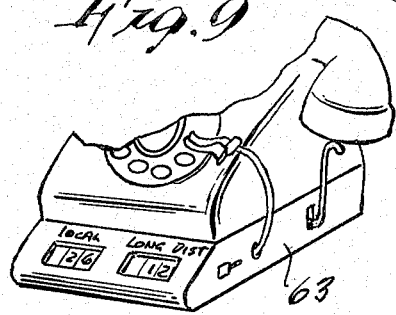

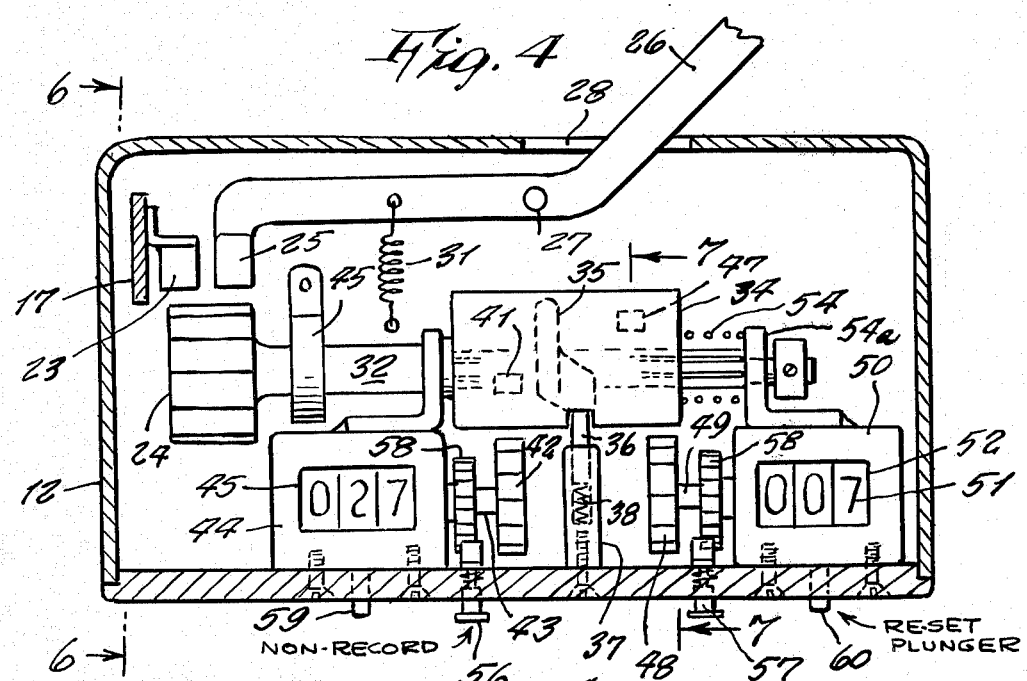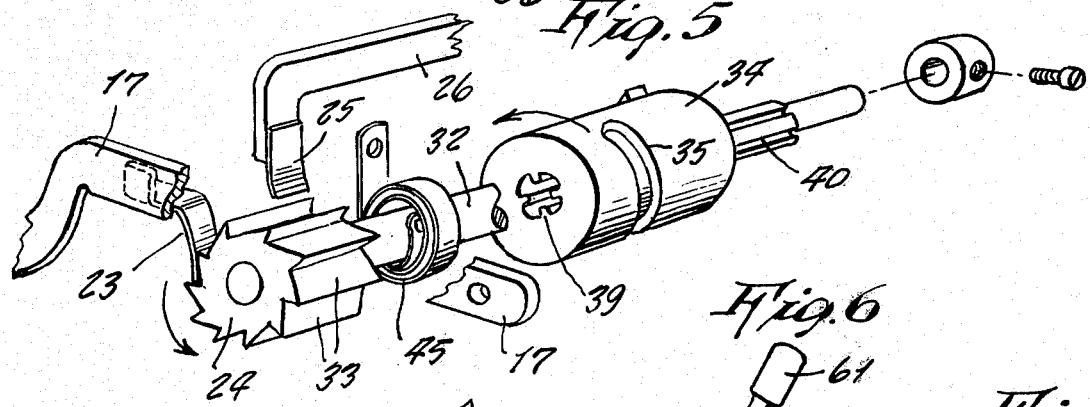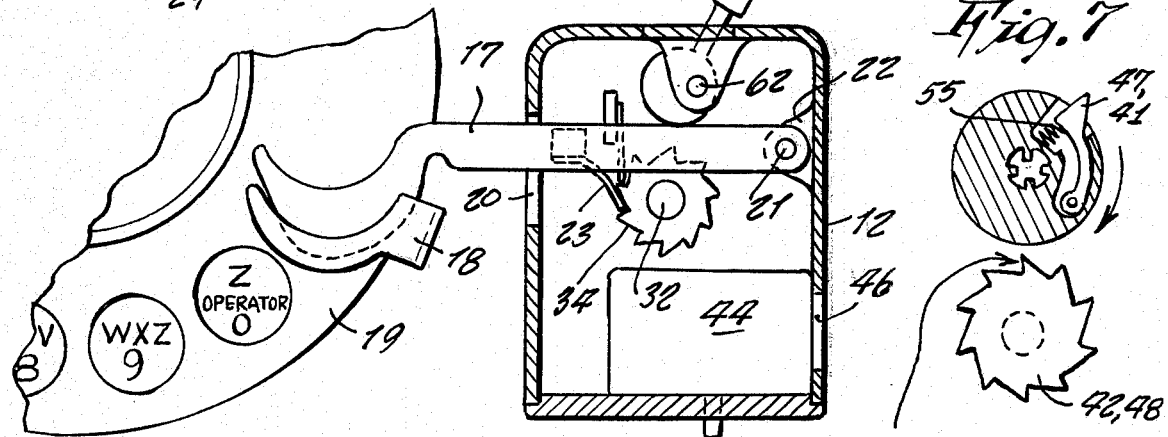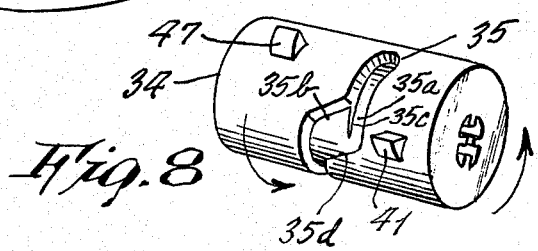

TELEPHONE CALL AMOUNT RECORDER

This invention relates to telephone receiver accessories.

It is well known that upon occasion a person is quite surprised at the large amount of his telephone bill, and he simply cannot believe that he has made as large a number of telephone calls as are indicated upon his monthly telephone bill, and unfortunately he has no way to keep track of calls as he makes them. This situation is, of course, objectionable and is, therefore, in want of an improvement.

Accordingly, it is a principal object of the present invention to provide an accessory attachable on a telephone desk set that automatically records the number of telephone calls being made over a period of time such as during each month so that their amount checks with the number shown on his bill.

Another object is to provide a telephone call amount recorder which otherwise keeps record of the number of calls made by other persons on an individual's telephone set while he was away.

Still another object is to provide a telephone call amount recorder which can keep track of only such calls for which a person is billed, and which, therefore, does not record free calls such as information for a telephone operator, wrong numbers, or numbers that are dialed, but which are not answered because the called party is not in.

Still a further object is to provide a telephone call amount recorder that keeps track of both local and long distance calls made.

Still a further object is to provide a telephone call amount recorder that can be quickly and easily installed on a telephone desk set, and which can be shut off when otherwise not wanted for a period of time, and which can be re-set each month if so wanted by a person.

Other objects are to provide a telephone call amount recorder which is simple in design, inexpensive to manufacture, rugged in construction, easy to use and efficient in operation.

These and other objects will be readily evident upon a study of the following specification and the accompanying drawing wherein:

FIG. 1 is a side view of a telephone desk set showing the invention mounted thereupon.

FIG. 2 is a front view thereof.

FIG. 3 is a perspective view of the invention.

FIG. 4 is an enlarged cross section taken generally on line 4—4 of FIG. 3.

FIG. 5 is a detail of mechanism shown in FIG. 4.

FIG. 6 is a cross section taken generally on line 6—6 of FIG. 4.

FIG. 7 is a cross section taken generally on line 7—7 of FIG. 4.

FIG. 8 is a perspective view of one of the components illustrated in FIG. 5, and showing an opposite side thereof.

FIG. 9 is a perspective view of a modified model of the invention.

Referring now to the drawings in detail, the reference numeral 10 represents a telephone call amount recorder according to the present invention wherein the same is attachable to a telephone desk set 11.

The recorder 10 includes a small case 12 firmly attached to a U-shaped bracket 13 that extends under and around opposite sides of the receiver 11 and which has a set screw 14 in one leg 15 of the bracket so that the receiver is clamped between the screw and a bracket leg 16.

When the recorder is firmly secured in proper position on the desk set, a lever 17 protruding outwardly from the interior of the case 12 is aligned just slightly ahead of the stop 18 of the telephone desk set so that upon each dealing of a numeral or letter under a telephone dial 19, a person's finger strikes and pushes the lever just before the finger meets the stop 18.

As best shown in FIG. 6, the lever 17, protruding outward of opening 20 of the case 12 is pivoted on a pin 21 secured on stationary bracket 22 inside the case. As the lever is pushed by a finger during dialing, a leaf spring pawl 23 secured to the lever pushes a ratchet wheel 24, rotatable in one direction due to a leaf spring stop pawl 25 secured on one end of a lever 26 pivotable about stationary pin 27 secured inside the case. The other end of the lever 26 protrudes outwardly of an opening 28 of the case, and the end of the lever is normally aligned to be pushed down by the telephone receiver 29 when it rests upon the cradle 30 of the desk set 11, so that at such time, the stop pawl 25 does not engage the ratchet wheel, however, when the receiver 29 is lifted from the cradle, prior to dialing a number the lever 26 is forced to pivot due to a tension coil spring 31 that thus causes the stop pawl to engage the ratchet wheel 24 so that a shaft 32 secured to the ratchet wheel rotates only in one direction while the receiver is lifted.

The ratchet wheel 24 has ten teeth 33, and the wheel is rotationally advanced one tooth each time that a number or letter is dialed on the telephone set. As the shaft 32 is turned together with the ratchet wheel, a barrel 34 on the shaft also turns. The barrel has a groove 35 that has an angular portion between opposite ends that are at right angles to the axis of the shaft rotation. The groove is engaged by a pin 36 supported on a stationary pedestal 37 having a conpression spring 38 that causes the pin 36 to bear in the bottom of the groove at all times. As the shaft 32 rotates during dialing, and after having advanced a total of seven teeth 33, the angular portion of the groove engages the pin 36 which thus causes the barrel to slide sideways along the axis of the shaft due to the barrel and shaft having engaging splines 39 and 40 respectively. Further dialing of numbers will thereafter cause the sidewardly shifted barrel to then continue rotate in the newly shifted position.

It is to be here noted, that in all cases where local telephone numbers are dialed that only seven digits are dialed so that the shaft in such instances is advanced only seven teeth 33 and that in such instance also that the barrel is not shifted axially. However, in case a person is dialing long distance, he dials ten digits that thus cause the barrel to be sidewardly shifted before the dialing is completed.

It is accordingly, also to be now noted, that upon the barrel there is a projecting tooth 41 which immediately after the dialing of the seventh digit engages behind a tooth of a rachet wheel 42 secured on a rotatable shaft 43 of a counter mechanism 44. This counter records local calls. After a telephone conversation is completed, and the receive is replaced upon the cradle, the stop pawl 25 disengages the ratchet 24. This causes a spiral leaf spring 45 secured at one end to shaft 32, and stationarily mounted at its other end to the case 12, and which during the dialing operation was getting wound up, to not finally unwind by rotating the shaft back into the opposite direction and back to the shaft original start position. The reverse rotation of the shaft causes the tooth 41 of the barrel to rotate the ratchet wheel 42 a distance of one of its teeth so to register one number in the window 45 of the counter and which is visible through a window 46 of the case 12.

In case a person is dialing a long distance number, the barrel is sideways shifted after the seventh dialing so that another tooth 47 of the barrel after the tenth dialing engages behind a tooth of a ratchet wheel 48 secured on a shaft 49 of a counter mechanism 50 that records long distance calls. After completing the call, the receiver is replaced on the cradle causing the stop pawl 25 to release the ratchet wheel 24 so that shaft 32 rotates in reverse directing causing tooth 47 to advance the ratchet wheel 48 one tooth and thus add an additional digit to the number 51 of counter 50, and which can be observed through to counter window 52 and the case window 53 aligned therewith.

It is to be noted that as the shaft 32 rotates into return position after a long distance telephone call, only the tooth 47 activates the long distance counter 50, but the tooth 41 does not activate the local counter 44. This is accomplished in the following manner. A compression coil spring 54 around shaft 32 at one end bears against a stationary shaft bearing bracket 54a and at its other end bears against the barrel 34 so that before a start of a dialing action the barrel is in a slided position as shown in FIG. 4 so that tooth 41 is aligned with ratchet wheel 42. After a long distance call is completed and receiver is restored on the cradle, the barrel is rotated with the shaft 32 and also slided into the original position by the spring 54. As best shown in FIGS. 4 and 8, the diagonal intermediate portion of the groove 35 is widen than either end, and additionally a portion 35a of the diagonal portion is deeper cut than diagonal portion 35b so that a shoulder 35c is formed therebetween. During the dialing action of a long distance number, the pin 36 travels on the shallow portion 35b of the diagonal portion due to the spring 54. However, after the call is completed, the receiver restored on the cradle and the shaft 32 rotates in reverse direction, the pin due to the force of spring 38 is forced to travel in the deeper portion 35a instead of on the shallower portion 35b, and the shoulder 35c prevents the pin 36 to get on the portion 35b even though spring 54 urges the barrel toward its original position. The pin 36 and the shoulder 35c thus prevents the barrel to be shifted on the reverse rotation of shaft 32 so that the tooth 41 does not engage the ratchet wheel 42 and accordingly no local call is thus recorded. Immediately thereafter the pin travels along diagonal wall 35d of the groove diagonal portion causing but by then the shoulder 35c is faded away so the spring 54 slides the barrel to original position, but by then the tooth 41 is turned too far so to engage or effect the ratchet wheel 42.

Of course, when dialing a local number, there is no sliding shift of the barrel so that tooth 41 engages ratchet wheel 42 before the pin reaches diagonal wall 35d.

It is to be noted also, as shown in FIG. 7, that each barrel tooth 41 and 47 are inwardly retractable into the barrel against a compression spring 55 so that during the dialing of the last digit of a telephone number, the tooth 41 or 47 simply retracts as it travels over the tooth of the ratchet wheel 42 or 48 instead pushing the same, and so that it gets behind the tooth, so that after the call completion and receiver restoration on the cradle, the tooth 41 or 47 rotates the ratchet wheel.

In case a person dials a wrong number, dials information from the telephone operator or if the called person is not in, such telephone call is prevented from being recorded by simply pushing a button 56 for local calls or a button 57 for long distance calls that activates a clutch 58 that prevents the shaft 43 or 49 leading into the counter to rotate while permiting only the ratchet wheel 42 or 48 to rotate so that such call is not recorded.

The accessory 10 can be provided, if wished by a manufacturer, with re-set plungers 59 and 60 so that the counters 44 and 50 can be numerically re-set each month, if so desired by a telephone user.

The accessory can also be provided with a lever 61 pivotable about a pin 62 so to depress the lever 17 into an inactive position behind the stop 18 so that the entire accessory 10 does not operate and record any telephone calls.

In FIG. 9, another model 63 of the invention is shown wherein the same fits underneath the telephone desk set so to be more out of the way.

While various changes may be made in the detail construction, it is understood that such changes will be within the spirit and scope of the present invention, as is defined by the appended claims:

What is claimed is:

1. A telephone outgoing call counter for attachment to a standard rotary dial telephone for counting the number of local and long distance calls made from said telephone, the device comprising:
   a housing to support said telephone,
   a first lever protruding from said housing positioned slightly ahead of the finger stop of said telephone to be engaged upon the dialing of any of the ten dial digits and a second lever protruding from said housing and positioned so as to be engaged by a receiver being placed on the cradle of said telephone, said housing containing first and second window openings behind which are placed first and second ratchet driven counters with corresponding numerical displays representing the number of local and long distance calls, respectively, made from said telephone, and a mechanism encased in said housing including a spring loaded ratchet and shaft arrangement, said ratchet having ten teeth, said first lever having an advancing pawl for rotating said ratchet one tooth for each engagement of said first lever, said second lever including a stop pawl for releasing said ratchet upon engagement of said second lever, and a barrel rotated with said shaft and adapted to increment said first counter upon the engagement of said second lever after a local call and to increment said second counter upon the engagement of said second lever after a long distance call.

2. A telephone call counter as in claim 1, wherein said barrel carries first and second retractable teeth and is carried on said shaft by engaging splines therebetween and is urged into a first postion corresponding to a local call by a compression spring, wherein said first retractable tooth will strike the ratchet wheel on said first counter after the engagement of said second lever following a local call.

3. A telephone call counter as in claim 2 wherein said barrel contains a groove engaged by a spring urged pin supported on a stationary pedestal, said groove including a widened diagonal central portion such that upon the eighth engagement of said first lever, the barrel is slided against said compression spring to a second position for alignment of said second retractable tooth with said second counter, wherein said second retractable tooth will strike the ratchet wheel of said second counter after engagement of said second lever following a long distance call.

4. A telephone call counter as in claim 3 wherein said widened diagonal central portion of said groove includes a shallow portion on one side corresponding to the first position and a deeper portion on the other side corresponding to the second position, with a shoulder in between.

5. A telephone call counter as in claim 1 wherein each of said counters are resettable and including a third lever protruding from said housing and adapted to deactivate said call counter upon actuation by pivoting said first lever behind said dial stop.

* * * * *